(12) United States Patent
Matsushita et al.

(10) Patent No.: US 10,875,451 B2
(45) Date of Patent: Dec. 29, 2020

(54) OBSTACLE DETECTING DEVICE

(71) Applicant: DENSO CORPORATION, Kariya, Aichi-pref. (JP)

(72) Inventors: Fumihiko Matsushita, Kariya (JP); Takuya Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/426,289

(22) Filed: May 30, 2019

(65) Prior Publication Data

US 2019/0275938 A1   Sep. 12, 2019

Related U.S. Application Data

(63) Continuation of application No. PCT/JP2017/038817, filed on Oct. 26, 2017.

(30) Foreign Application Priority Data

Dec. 5, 2016 (JP) .................................. 2016-236044

(51) Int. Cl.

| | |
|---|---|
| *B60Q 1/00* | (2006.01) |
| *B60Q 9/00* | (2006.01) |
| *E05F 15/73* | (2015.01) |
| *B60N 2/00* | (2006.01) |
| *B60R 22/48* | (2006.01) |
| *G01S 7/56* | (2006.01) |

(Continued)

(52) U.S. Cl.
CPC .............. *B60Q 9/00* (2013.01); *B60N 2/002* (2013.01); *B60R 22/48* (2013.01); *E05F 15/73* (2015.01); *G01S 7/56* (2013.01); *G01S 15/93* (2013.01); *B60R 2022/4866* (2013.01); *E05Y 2900/531* (2013.01); *G01S 15/931* (2013.01); *G01S 2015/937* (2013.01); *G01S 2015/938* (2013.01)

(58) Field of Classification Search
None
See application file for complete search history.

(56) References Cited

U.S. PATENT DOCUMENTS

| 6,100,796 A | 8/2000 | Wagner et al. |
|---|---|---|
| 2005/0237168 A1 | 10/2005 | Matsukawa et al. |

(Continued)

FOREIGN PATENT DOCUMENTS

| JP | 2005-297636 A | 10/2005 |
|---|---|---|
| JP | 2007-153193 A | 6/2007 |

(Continued)

*Primary Examiner* — Adolf Dsouza
(74) *Attorney, Agent, or Firm* — Maschoff Brennan (57) ABSTRACT

An obstacle detecting device for detecting an obstacle around a vehicle includes a sensor, a notifying unit, an operation detecting unit, and a control unit. The sensor is installed at a fixed portion of the vehicle to detect an obstacle within a predetermined detection range with an origin corresponding to a position where the sensor is installed. The notifying unit provides a notification based on a signal output from the sensor. The operation detecting unit detects an operation of a movable portion of the vehicle moving within the detection range of the sensor. The control unit is enabled to inhibit a notifying operation of the notifying unit when the operation detecting unit detects the operation of the movable portion.

11 Claims, 8 Drawing Sheets

(51) Int. Cl.
 *G01S 15/93* (2020.01)
 *G01S 15/931* (2020.01)

(56) References Cited

U.S. PATENT DOCUMENTS

| | | | | |
|---|---|---|---|---|
| 2006/0255922 | A1* | 11/2006 | Taki | E05F 15/40 340/438 |
| 2007/0084955 | A1* | 4/2007 | Tanaka | B60R 22/02 242/374 |
| 2016/0369551 | A1* | 12/2016 | Suzuki | E05F 15/70 |
| 2016/0378104 | A1* | 12/2016 | Hiei | B60Q 9/00 701/2 |
| 2019/0284851 | A1* | 9/2019 | Miyashiro | E05C 17/006 |
| 2020/0018111 | A1* | 1/2020 | Akbarian | E05F 15/42 |

FOREIGN PATENT DOCUMENTS

| | | |
|---|---|---|
| JP | 4473973 B | 6/2010 |
| JP | 2017-32432 A | 2/2017 |

\* cited by examiner

OBSTACLE DETECTING DEVICE

CROSS REFERENCE TO RELATED APPLICATION

This application is an U.S. application under 35 U.S.C. 111(a) that claims the benefit under 35 U.S.C. 120 from International Application No. PCT/JP2017/038817 filed on Oct. 26, 2017, the entire contents of which are incorporated herein by reference. The present application is also based on Japanese patent application No. 2016-236044 filed on Dec. 5, 2016, the entire contents of which are incorporated herein by reference.

BACKGROUND

Technical Field

The present disclosure relates to an obstacle detecting device.

Background Art

A conventional obstacle detecting device determines a detected object to be an obstacle in a case where a distance between the sensor and the detected object changes when the vehicle moves, while determining the detected object to be a vehicle component fixed to the vehicle body in a case where the distance remains unchanged when the vehicle moves. Thus, in a case where a detection range of the sensor overlaps a vehicle component such as a towing hitch which is fixed to the vehicle body, the obstacle detecting device inhibits unnecessary notifications.

SUMMARY

According to an aspect of the present disclosure,
an obstacle detecting device for detecting an obstacle around a vehicle is provided, the obstacle detecting device including:
a sensor installed to detect an obstacle within a predetermined detection range,
a notifying unit providing a notification,
an operation detecting unit detecting an operation of a movable portion moving within the detection range of the sensor, and
a control unit capable of inhibiting a notifying operation of the notifying unit.

DETAILED DESCRIPTION OF THE PREFERRED EMBODIMENTS

The inventor of the present disclosure has studied an obstacle detecting device capable of reducing notifying operations unintended by the occupants.

As a result of the inventors' detailed studies, problems described below were found in the conventional obstacle detecting device. That is, the known obstacle detecting device determines whether the object detected by the sensor is a vehicle component when the vehicle has moved. Thus, the determination fails to be made while the vehicle is stopped. Furthermore, in a case where the detection range of the sensor overlaps an area where a movable portion such as a door provided in the vehicle body operates, opening of the door changes a distance between the sensor and the door and may thus cause the obstacle detecting device to determine the door to be an obstacle to notify the occupants of the detection. In a case where an operation of the movable portion such as opening of the door is an act of any of the occupants including a driver, notifying the occupants of the door as an obstacle is an unnecessary notification unintended by the occupants. This may degrade convenience of the obstacle detecting device.

An object of the present disclosure is to provide an obstacle detecting device capable of reducing notifying operations unintended by the occupants.

According to an aspect of the present disclosure,
an obstacle detecting device for detecting an obstacle around a vehicle is provided, the obstacle detecting device including:
a sensor installed at a fixed portion of the vehicle to detect an obstacle within a predetermined detection range with an origin corresponding to a position where the sensor is installed,
a notifying unit providing a notification based on a signal output from the sensor,
an operation detecting unit detecting an operation of a movable portion of the vehicle moving within the detection range of the sensor, and
a control unit capable of inhibiting a notifying operation of the notifying unit when the operation detecting unit detects an operation of the movable portion.

Thus, when a signal is output from the sensor and the operation detecting unit detects an operation of the movable portion of the vehicle, the control unit can inhibit the notifying operation of the notifying unit. The control unit may be capable of setting, depending on the occupants' request or preference, whether to inhibit the notifying operation of the notifying unit resulting from an operation of the movable portion. Accordingly, the obstacle detecting device can reduce unnecessary notifications unintended by the occupants, improving convenience.

Embodiments of the present disclosure will be described based on the drawings. In the embodiments described below, identical or equivalent components are denoted by the same reference signs.

First Embodiment

A first embodiment will be described with reference to the drawings. An obstacle detecting device according to the present embodiment detects an obstacle around a vehicle when the vehicle is, for example, backed up, stopped, or started, or is traveling.

Figure 1:
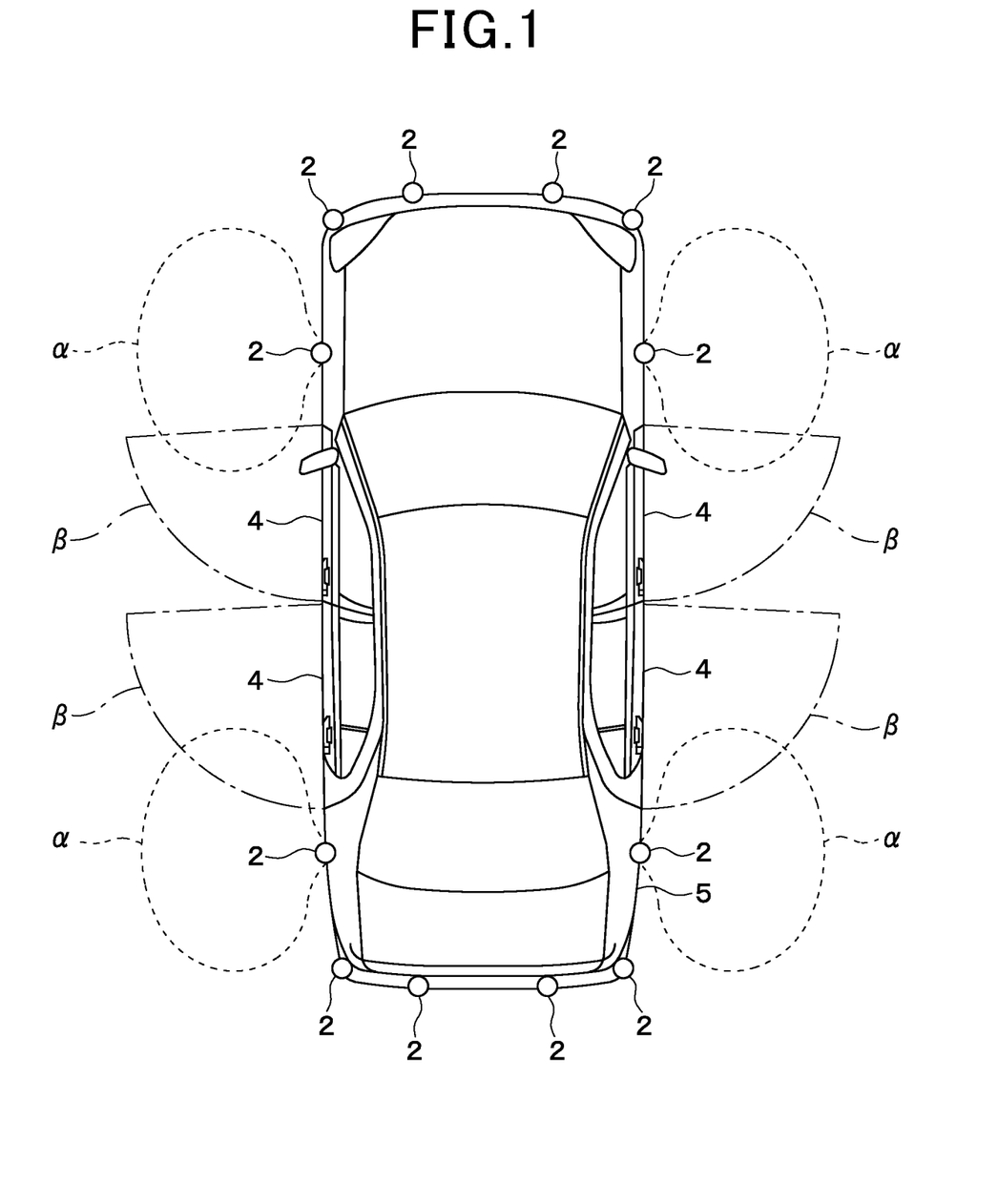
FIG. 1 is a schematic diagram of a vehicle in which an obstacle detecting device according to a first embodiment is mounted.
Figure 2:
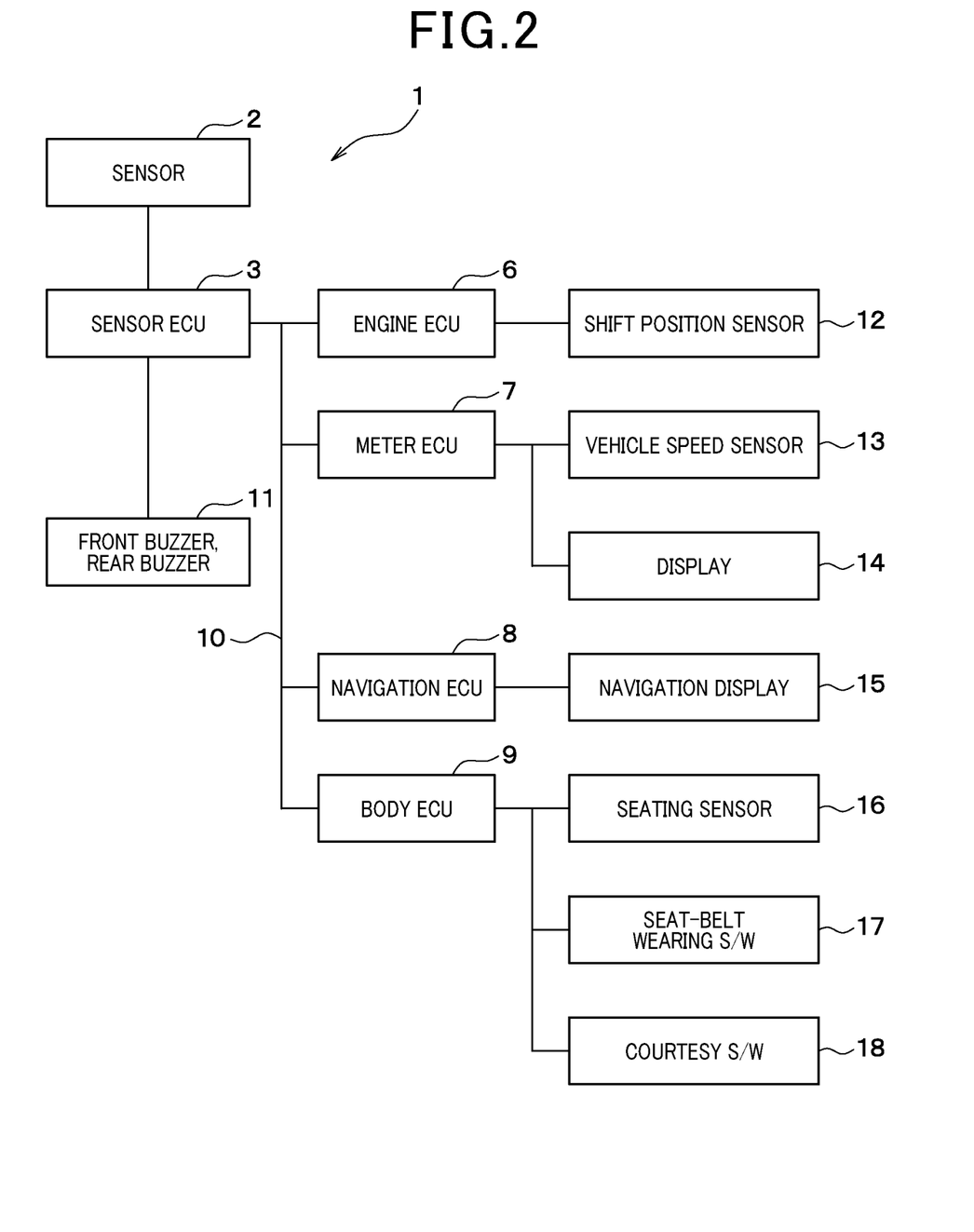
FIG. 2 is a block diagram of the obstacle detecting device according to the first embodiment.

As illustrated in FIG. 1 and FIG. 2, the obstacle detecting device 1 according to the present embodiment includes a plurality of sensors 2 installed on the vehicle and a sensor ECU 3 used as a control unit to process signals transmitted from the sensors 2.

The plurality of sensors 2 are installed on a vehicle body of the vehicle or at a fixed portion 5 of the vehicle that is a portion located at a constant distance from the vehicle body. The plurality of sensors 2 are installed at positions on the fixed portion 5 corresponding to the front, lateral sides, and rear of the vehicle. The plurality of sensors 2 are, for example, ultrasonic sensors, and can each detect an obstacle within a predetermined detection range with an origin corresponding to a position where the sensor 2 is installed. The ultrasonic sensor includes an unillustrated transmission unit transmitting an ultrasonic wave and an unillustrated reception unit receiving a reflected wave reflected by an obstacle. The presence of an obstacle and a distance to the obstacle can be calculated based on a relationship between a time interval from transmission until reception and the speed of sound. FIG. 1 schematically illustrates, by dashed lines, detection ranges a of the sensors 2 installed near doors 4 among the plurality of sensors 2. The sensors 2 other than the sensors 2 installed near the doors 4 have similar detection ranges.

Furthermore, in FIG. 1, movable areas 13 of single swinging side doors 4 provided on the lateral sides of the vehicle are illustrated by alternate long and short dash lines with reference sign β. The side doors 4 are an example of movable portions provided on the vehicle body. The detection range a of each of the sensors 2 installed at positions on the fixed portion 5 corresponding to the lateral sides of the vehicle overlaps the movable area β of the side door 4 located near the sensor 2. Thus, opening of the side door 4 causes the sensor 2 installed on the lateral side of the vehicle to output a corresponding signal.

A single sensor 2 may be mounted on the vehicle. Furthermore, radar sensors or imaging devices may be adopted as the sensors 2. In the description below, these sensors are simply referred to as the sensors 2.

Furthermore, the movable portions with the movable areas β overlapping the detection ranges a of the sensors 2 may be sliding side doors or a back door. In the description below, these movable portions are simply referred to as the doors 4.

FIG. 2 illustrates, in a block diagram, a plurality of electronic control units (hereinafter referred to as "ECUs") provided in the vehicle in which the obstacle detecting device 1 according to the present embodiment is mounted, equipment electrically connected to the ECUs, and the like.

Signals output from the above-described plurality of sensors 2 are transmitted to a sensor ECU 3. Furthermore, the sensor ECU 3 is connected to an engine ECU 6, a meter ECU 7, a navigation ECU 8, a body ECU 9, and the like by a CAN communication bus 10. The CAN is an abbreviation of the Controller Area Network. The sensor ECU 3 can drive one or more buzzers 11 to emit a sound indicative of a direction of an obstacle and a distance to the obstacle based on the signal transmitted from the sensor 2 and information obtained from the ECUs.

A signal corresponding to a shift position of the vehicle is transmitted from a shift position sensor 12 to the engine ECU 6. Based on the signal, the engine ECU 6 detects the shift position of the vehicle.

A signal corresponding to a vehicle speed of the vehicle is transmitted from a vehicle speed sensor 13 to the meter ECU 7. Based on the signal, the meter ECU 7 detects the vehicle speed of the vehicle. Furthermore, the meter ECU 7 can cause a multi-information display 14 provided on an instrumental panel in a vehicle interior to display information about the direction of the obstacle and the distance to the obstacle based on a signal transmitted from the sensor ECU 3.

The navigation ECU 8 can also cause a navigation display 15 to display the information about the direction of the obstacle and the distance to the obstacle based on the signal transmitted from the sensor ECU 3.

Signals from a seating sensor 16, a seat belt wearing switch 17, a courtesy switch 18, and the like are transmitted to the body ECU 9. The seating sensor 16 outputs, to the body ECU 9, signals corresponding to sitting of occupants in respective seats in the vehicle. Based on the signals, the body ECU 9 detects whether the occupants are sitting in the respective seats.

The seat belt wearing switch 17 outputs, to the body ECU 9, signals corresponding to wearing of seat-belts of the respective seats. Based on the signals, the body ECU 9 detects whether the seat-belts of the seats are being worn.

The courtesy switch 18 outputs, to the body ECU 9, signals corresponding to opening or closure of the doors 4 of the vehicle. Based on the signals, the body ECU 9 detects whether the doors 4 are open. The courtesy switch 18 is an example of an operation detecting unit detecting operations of the movable portions such as the doors 4. A body imaging device imaging the doors 4 or an opening degree detecting sensor detecting an opening degree of the doors 4 may be adopted as the operation detecting unit.

As described above, the sensor ECU 3, the engine ECU 6, the meter ECU 7, the navigation ECU 8, and the body ECU 9 are connected by the CAN communication bus 10. Thus, CAN communication with the sensor ECU 3, the engine ECU 6, the meter ECU 7, the navigation ECU 8, the body ECU 9, and the like enables obtainment of information about the shift position, the vehicle speed, whether the occupants are sitting in the respective seats, whether the seat-belts are worn, opening or closure of the doors 4, and the like. Accordingly, the sensor ECU 3 can cause the multi-information display 14 to display, via the meter ECU 7, the information about the direction of the obstacle and the distance to the obstacle based on the signals transmitted from the sensors 2 and the information obtained from the ECUs. The sensor ECU 3 can also cause the navigation display 15 to display, via the navigation ECU 8, the information about the direction of the obstacle and the distance to the obstacle based on the signals transmitted from the sensors 2 and the information obtained from the ECUs.

Moreover, the sensor ECU 3 can drive the one or more buzzers 11 to emit the sound indicative of the direction of the obstacle and the distance to the obstacle based on the signals transmitted from the sensors 2 and the information obtained from the ECUs. The sensor ECU 3 may drive a speaker of unillustrated audio equipment installed in the vehicle, instead of the one or more buzzers 11. Accordingly, each of the above-described multi-information display 14, navigation display 15, buzzer 11, and speaker is an example of a notifying unit providing notifications based on the signals output from the sensors 2.

Figure 3:
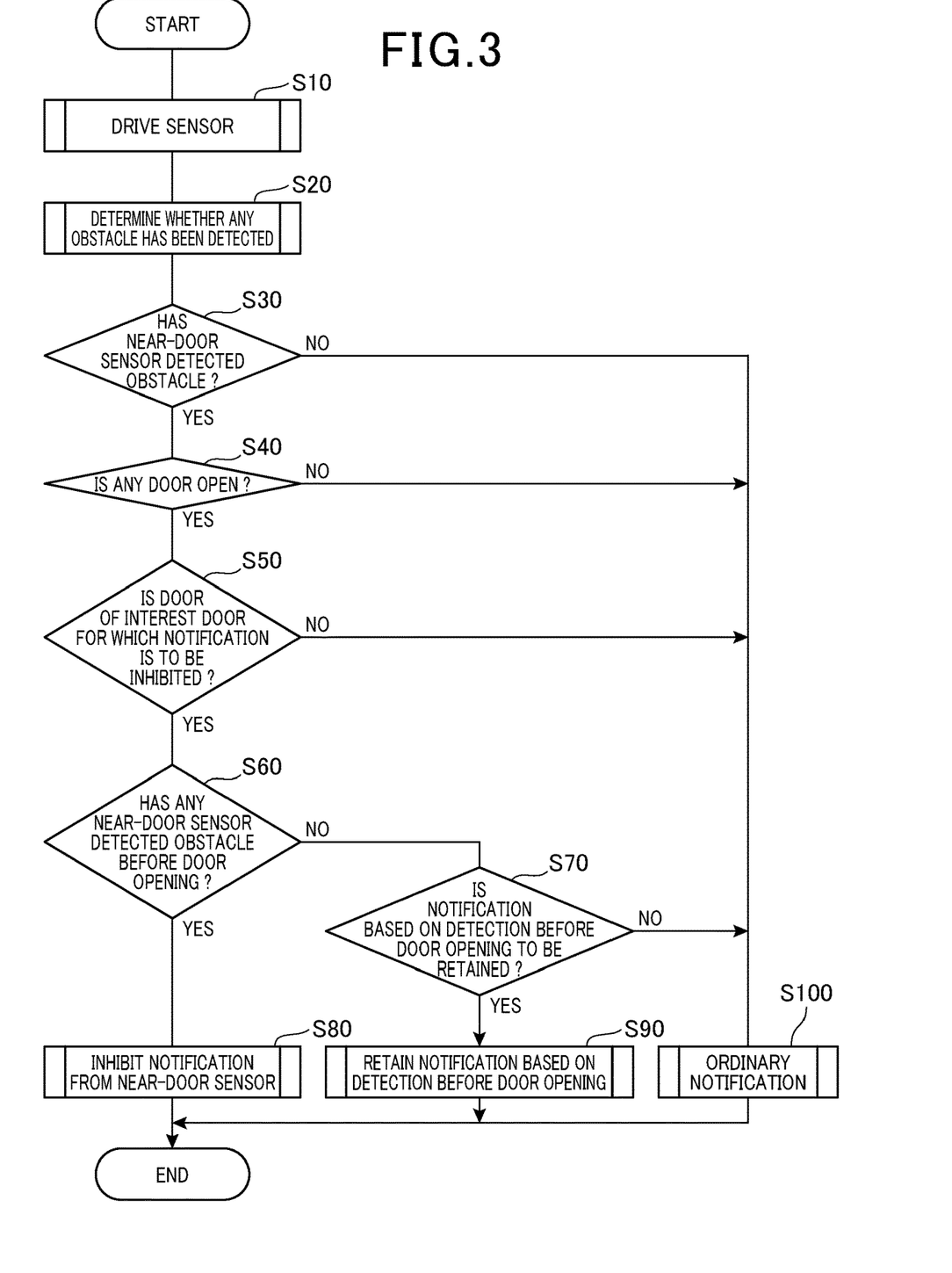
FIG. 3 is a flowchart illustrating control of the obstacle detecting device according to the first embodiment.

Now, control performed by the sensor ECU 3 will be described with reference to a flowchart in FIG. 3.

In the description below, the sensor ECU 3 is simply referred to as the ECU 3. Furthermore, the multi-information display 14 and the navigation display 15 are simply referred to as displays 14 and 15.

The control is started by turning on an ignition switch.

In step S10, the sensors 2 are driven. The sensors 2 start being driven, for example, when the shift position is set to reverse or when a sensor switch provided in the instrument panel is turned on. Furthermore, the sensors 2 may simultaneously start being driven when the ignition switch is turned on. The sensors 2 then transmit ultrasonic waves from the respective transmission units. In a case where any obstacle is present within the detection range a of any of the sensors 2, the reception unit of the sensor 2 receives a reflected wave reflected by the obstacle. Signals transmitted from and received by the sensors 2 are transmitted to the ECU 3.

In step S20, the ECU 3 determines whether any obstacle is present and calculates the distance to the obstacle, based on a relationship between the speed of sound and a time interval from a time point of transmission of ultrasonic waves from the sensors 2 until a time point of reception of the ultrasonic wave.

In step S30, the ECU 3 determines whether any obstacle has been detected by any of the sensors 2 installed near the doors 4. The sensors 2 installed near the doors 4 are the sensors 2 that are included in the plurality of sensors 2 installed on the vehicle and that have the detection ranges a overlapping the movable areas β of the respective doors 4. In the description below, these sensors 2 are referred to as "near-door sensors 2".

In step S30, in a case where no obstacle has been detected by the near-door sensors 2, the process shifts to step S100. In step S100, the ECU 3 provides an ordinary notification. The ordinary notification refers to the ECU 3 causing the displays 14 and 15 to display the information about the direction of an obstacle and the distance to the obstacle and driving the buzzer 11 to emit the sound indicative of the direction of the obstacle and the distance to the obstacle. In this case, if any obstacle has been detected by any of the sensors 2 other than the near-door sensors 2, the ECU 3 provides the ordinary notification using the displays 14 and 15 and the buzzer 11 based on information detected by this other sensor 2.

On the other hand, in a case where any obstacle has been detected by any of the near-door sensors 2, the process shifts to step S40.

In step S40, the ECU 3 determines whether any of the doors 4 is open based on a signal output from the operation detecting unit such as the courtesy switch 18. In step S40, in a case where the ECU 3 determines that the doors 4 are closed, the process shifts to step S100.

On the other hand, in step S40, if it is determined that any of the doors 4 is open, the process shifts to step S50. In this case, the detection signal from the corresponding near-door sensor 2 is likely to correspond to detection of the door 4. Thus, a process described below is intended to determine whether to inhibit the notifying operation based on the detection signal from the near-door sensor 2.

In step S50, the ECU 3 determines whether the door determined to be open in step S40 is the door for which the notification is to be inhibited. In the present embodiment, the door for which the notification is to be inhibited refers to the door 4 corresponding to the seat in which the occupant is sitting. Whether the occupant is sitting in the seat can be determined based on a signal output from the seating sensor 16 or the seat belt wearing switch 17.

In step S50, in a case where no occupant is sitting in the seat corresponding to the open door 4, if it is determined that the door 4 is not the door for which the notification is to be inhibited and the process proceeds to step S100. In this case, the door 4 is likely to have been opened from the outside, and thus, the ordinary notification is provided in step S100.

On the other hand, in a case where the occupant is sitting in the seat corresponding to the open door 4, if it is determined that the door is the door for which the notification is to be inhibited, and the process proceeds to step S60. In this case, one of the occupants including the driver is likely to have opened the door 4, and thus, inhibiting the notifying operation based on the detection signal for the door 4 from the sensor 2 is preferable in view of a reduction in unnecessary notifications unintended by the occupants.

In step S50, in a case where the shift position is set to parking, the ECU 3 may proceed the process to step S60 or end the process regardless of whether the notification is to be inhibited for the door of interest. Whether the shift position is set to parking can be determined based on the signal output from the shift position sensor 12.

In a case where the shift position is set to parking, the vehicle is parked or stopped. In general, when the vehicle is parked or stopped, information about obstacles around the vehicles is unnecessary. Thus, inhibiting the notifying operation based on the detection signal from the sensor 2 is preferable in view of a reduction in unnecessary notifications unintended by the occupants.

In step S60, the ECU 3 determines whether any obstacle has been detected via the signals output from the near-door sensors 2 before the signal from the operation detecting unit such as the courtesy switch 18 is transmitted to the ECU 3. In the description below, "detection before door opening" refers to detection of an obstacle based on the output signals from the near-door sensors 2 before the signal from the operation detecting unit is transmitted to the ECU 3.

In step S60, in a case where none of the near-door sensors 2 are determined to have detected an obstacle before door opening, the process proceeds to step S80. In step S80, the ECU 3 inhibits the notifications from the near-door sensors 2. Specifically, the ECU 3 causes the displays 14 and 15 to display the direction of and the distance to an obstacle detected by any of the sensors 2 other than the near-door sensors 2 while not to display information about an obstacle detected by any of the near-door sensors 2. Alternatively, the ECU 3 drives the buzzer 11 to emit the sound indicative of the direction of and the distance to an obstacle detected by any of the sensors 2 other than the near-door sensors 2 while not to emit a sound indicative of information about an obstacle detected by any of the near-door sensors 2.

In step S60, in a case where if it is determined that any of the near-door sensors 2 has detected an obstacle before door opening, the process proceeds to step S70. In step S70, the ECU 3 determines whether to retain the notification based on the detection before door opening by any of the near-door sensors 2. Whether to retain the notification based on the detection before door opening can be preset in the ECU 3. In a case where retention of the notification based on the detection before door opening is set in the ECU 3, the process proceeds to step S90.

In step S90, the ECU 3 performs a notifying operation with the retained notification based on the detection before door opening. That is, the ECU 3 causes the displays 14 and 15 to display the information about an obstacle detected via the signals output by the near-door sensors 2 before the signal from the operation detecting unit such as the courtesy switch 18 is transmitted to the ECU 3. Alternatively, the ECU 3 causes the buzzer 11 to emit the sound indicative of the information about an obstacle detected via the signals output by the near-door sensors 2 before the signal from the operation detecting unit such as the courtesy switch 18 is transmitted to the ECU 3. This enables to avoid the occupants from being confused by the stoppage of provision of the obstacle information due to opening of the door 4.

On the other hand, in a case where retention of the detection before door opening is not set in the ECU 3, the process proceeds to step S100. In step S100, the ECU 3 performs the ordinary notification. In this case, the ECU 3 causes the displays 14 and 15 to display the information based on the signal output by any of the near-door sensors 2 after the signal from the operation detecting unit such as the courtesy switch 18 is transmitted to the ECU 3. Alternatively, the ECU 3 causes the buzzer 11 to emit the sound indicative of the information based on the signal output by any of the near-door sensors 2 after the signal from the operation detecting unit such as the courtesy switch 18 is transmitted to the ECU 3. The information provided in this case has been obtained by any of the near-door sensors 2 by detecting the door 4, which is a movable portion.

The settings in steps S30, S40, S50, S60, and S70 described above can be customized by being appropriately changed or omitted according to a request or preference of the occupants, a dealer, or a manufacturer.

The obstacle detecting device 1 according to the first embodiment described above exhibits the following operations and effects.

(1) In the first embodiment, when the near-door sensors 2 output signals and the operation detecting unit such as the courtesy switch 18 detects an operation of the door 4, which is a movable portion, the ECU 3 can inhibit the notifying operation of the notifying unit such as the displays 14 and 15 or the buzzer 11. Thus, the obstacle detecting device 1 can reduce unnecessary notifications unintended by the occupants, improving convenience.

(2) In the first embodiment, the ECU 3 can change the setting of whether to inhibit the notifying operations of the notifying units 11, 14, and 15 when the courtesy switch 18 or the like detects an operation of the door 4.

Accordingly, in a case where the occupants or the like request notification about operations of the doors 4, the ECU 3 can retain the notifying operations of the notifying units 11, 14, and 15. On the other hand, in a case where the occupants or the like do not request notification about operations of the doors 4, the ECU 3 can inhibit the notifying operations of the notifying units 11, 14, and 15. Accordingly, the obstacle detecting device 1 can improve convenience according to the request or preference of the occupants or the like.

(3) In the first embodiment, the ECU 3 can inhibit the notifying operations of the notifying units 11, 14, and 15 based on the signal output from the predetermined near-door sensor 2 corresponding to the door 4 the operation of which has been detected by the courtesy switch 18 or the like. On the other hand, the ECU 3 retains the notifying operations of the notifying units 11, 14, and 15 based on the signals output from the sensors other than the predetermined near-door sensor 2.

Thus, even in a case where the notification based on the signal output from the predetermined near-door sensor 2 is inhibited, the notifications are provided that are based on the signals output from the sensors 2 other than the predetermined near-door sensor 2. Accordingly, the obstacle detecting device 1 reduces unnecessary notifications unintended by the occupants, while notifying information about an obstacle around the vehicle, thus allowing convenience to be improved.

(4) In the first embodiment, when the seating sensor 16 detects any of the occupants sitting in the predetermined seats and an operation of the door 4 corresponding to the predetermined seat is detected, the ECU 3 can control the notifying operations of the notifying units 11, 14, and 15.

Thus, in a case where the door 4 is operated by an act of the occupant sitting in the predetermined seat, the ECU 3 can inhibit the notifying operations of the notifying units 11, 14, and 15. On the other hand, in a case where the door 4 corresponding to the seat in which no occupant is sitting is opened, for example, from the outside, the notifying units 11, 14, and 15 perform the notifying operations. Accordingly, the obstacle detecting device 1 reduces unnecessary notifications unintended by the occupants, while notifying the other information, thus allowing convenience to be improved.

(5) In the first embodiment, when the seat belt wearing switch 17 detects that the seat-belt of the predetermined seat is worn and an operation of the door 4 corresponding to the predetermined seat is detected, the ECU 3 can control the notifying operations of the notifying units 11, 14, and 15.

Thus, in a case where the door 4 is operated by an act of the occupant sitting in the predetermined seat with the seat-belt worn, the ECU 3 can inhibit the notifying operations of the notifying units 11, 14, and 15. On the other hand, in a case where the door 4 corresponding to a seat with the seat-belt not worn is opened, for example, from the outside, the notifying units 11, 14, and 15 perform the notifying operations. Accordingly, the obstacle detecting device 1 reduces unnecessary notifications unintended by the occupants, while notifying the other information, thus allowing convenience to be improved.

(6) In the first embodiment, when the shift position sensor 12 detects that the shift position is set to parking and an operation of any of the doors 4 has been detected, the ECU 3 can control the notifying operations of the notifying units 11, 14, and 15.

In this case, the shift position being set to parking corresponds to the vehicle being parked or stopped. In general, while the vehicle is parked or stopped, the information about obstacles around the vehicle is unnecessary, and thus, the ECU 3 can inhibit the notifying operations of the notifying units 11, 14, and 15. Accordingly, the obstacle detecting device 1 can improve convenience.

(7) In the first embodiment, in a case where the courtesy switch 18 or the like detects an operation of any of the doors 4 after any of the near-door sensors 2 detects an obstacle, the notifying operations of the notifying units 11, 14, and 15 can be retained.

Consequently, in a case where, during the notifying operations of the notifying units 11, 14, and 15 resulting from detection of an obstacle by any of the near-door sensors 2, the door 4 moving within the detection range a of this near-door sensor 2 is operated, the ECU 3 can retain the notifying operations of the notifying units 11, 14, and 15. Thus, the information about the obstacle detected by the near-door sensor 2 is notified to the occupants, without inhibited by the operation of the door 4. Accordingly, the obstacle detecting device 1 can prevents the occupants from being confused by stoppage of provision of the obstacle information due to opening of the door 4, allowing convenience to be improved.

(8) In the first embodiment, in a case where the courtesy switch 18 or the like detects an operation of any of the doors 4 after any of the near-door sensors 2 detects an obstacle, the ECU 3 causes the notifying units 11, 14, and 15 to perform notifying operations based on one of the following signals. That is, the ECU 3 can cause the notifying units 11, 14, and 15 to perform notifying operations based on signals having been output from the near-door sensors 2 before detection of the operation of the door 4. Alternatively, the ECU 3 can cause the notifying units 11, 14, and 15 to perform notifying operations based on signals output from the near-door sensors 2 after detection of the operation of the door 4.

Thus, in a case where the notifying units 11, 14, and 15 perform the notifying operations based on the signals having been output from the near-door sensors 2 before detection of the operation of the door 4, the occupants can recognize, for example, the distance to the obstacle detected by any of the near-door sensors 2. On the other hand, in a case where the notifying units 11, 14, and 15 perform the notifying operations based on the signals output from the near-door sensors 2 after detection of the operation of the door 4, the occupants can recognize the operation of the door 4. The ECU 3 can optionally set which of the signals the notifications are to be based on according to the occupants' request or preference.

Second Embodiment

A second embodiment will be described. Compared to the first embodiment, the second embodiment illustrates another example of the operation detecting unit for detecting an operation of the movable portion, and is otherwise similar to the first embodiment. Thus, only differences from the first embodiment will be described.

Figure 4:
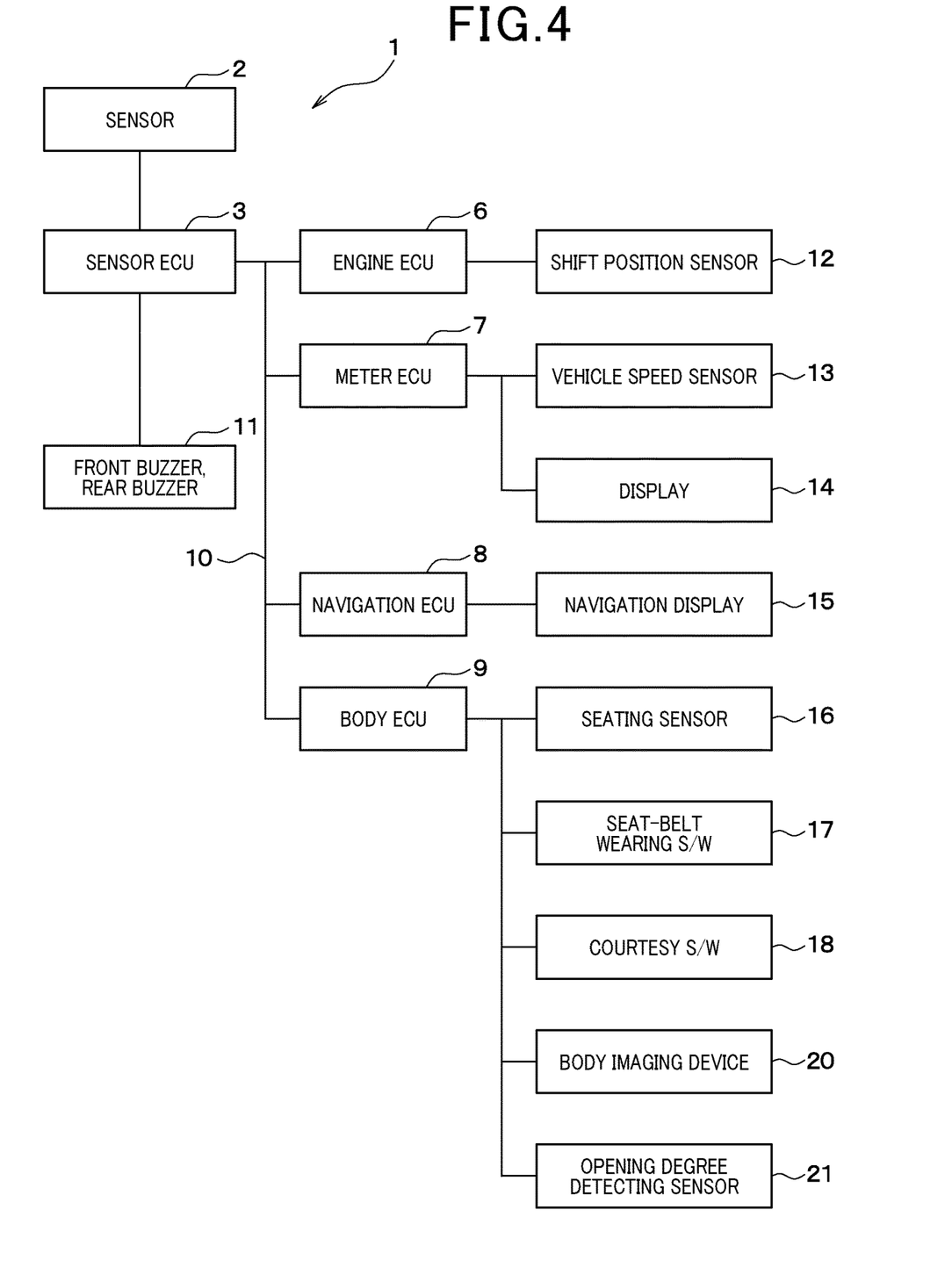
FIG. 4 is a block diagram of an obstacle detecting device according to a second embodiment.

As illustrated in FIG. 4, in the second embodiment, signals from a body imaging device 20, an opening degree detecting sensor 21, or the like, in addition to the courtesy switch 18, are transmitted to the body ECU 9. The body imaging device 20 can image the doors 4. The body imaging device 20 outputs, to the body ECU 9, image information resulting from imaging of the doors 4. Based on the image information, the body ECU 9 detects the opening degree of the door 4 or determines whether each of the doors 4 is open.

The opening degree detecting sensor 21 can detect the opening degree of each door 4. The opening degree detecting sensor 21 outputs, to the body ECU 9, a signal corresponding to the opening degree of the door 4. Based on the signal, the body ECU 9 determines whether the door 4 is open or detects the opening degree of the door 4.

The above-described courtesy switch 18, body imaging device 20, and opening degree detecting sensor 21 are an example of the operation detecting unit. It is sufficient that the obstacle detecting device 1 includes, as the operation detecting unit, at least one of the courtesy switches 18, the body imaging device 20, and the opening degree detecting sensor 21.

In the second embodiment, the obstacle detecting device 1 can adopt, as the operation detecting unit, at least one of the courtesy switches 18, the body imaging device 20, and the opening degree detecting sensor 21.

Third Embodiment

A third embodiment will be described. The third embodiment corresponds to the first and second embodiments to which a mechanism reducing the opening degree of the door 4 is added, and is otherwise similar to the first embodiment. Thus, only differences from the first and second embodiments will be described.

Figure 5:
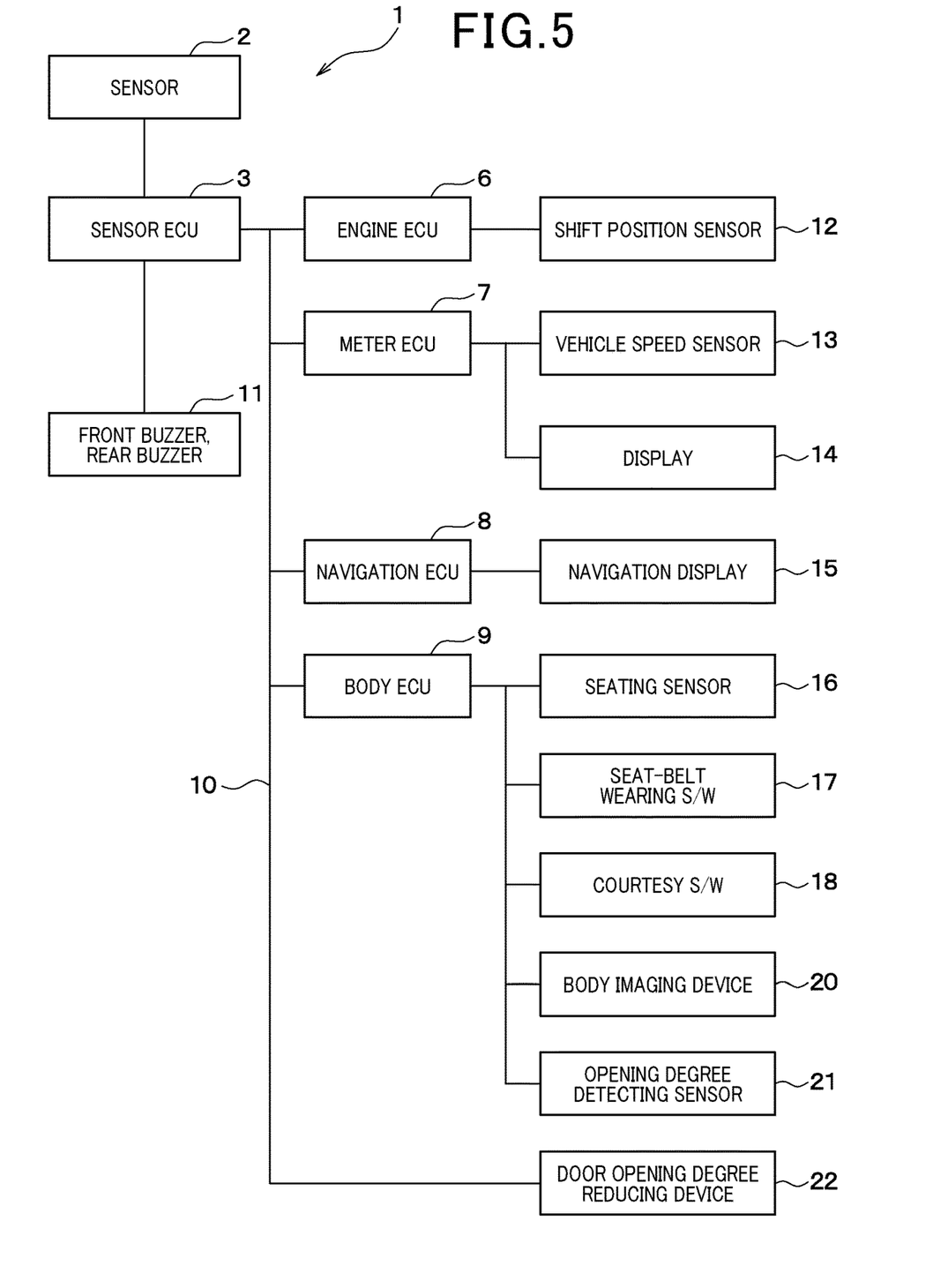
FIG. 5 is a block diagram of an obstacle detecting device according to a third embodiment.

As illustrated in FIG. 5, the obstacle detecting device 1 according to the third embodiment includes a door opening degree reducing device 22. The door opening degree reducing device 22 is a device capable of stopping opening of the door 4 at a predetermined angle using a mechanical or electromagnetic configuration. The door opening degree reducing device 22 is an example of a movement restricting unit restricting the operation of the movable portion.

Figure 6:
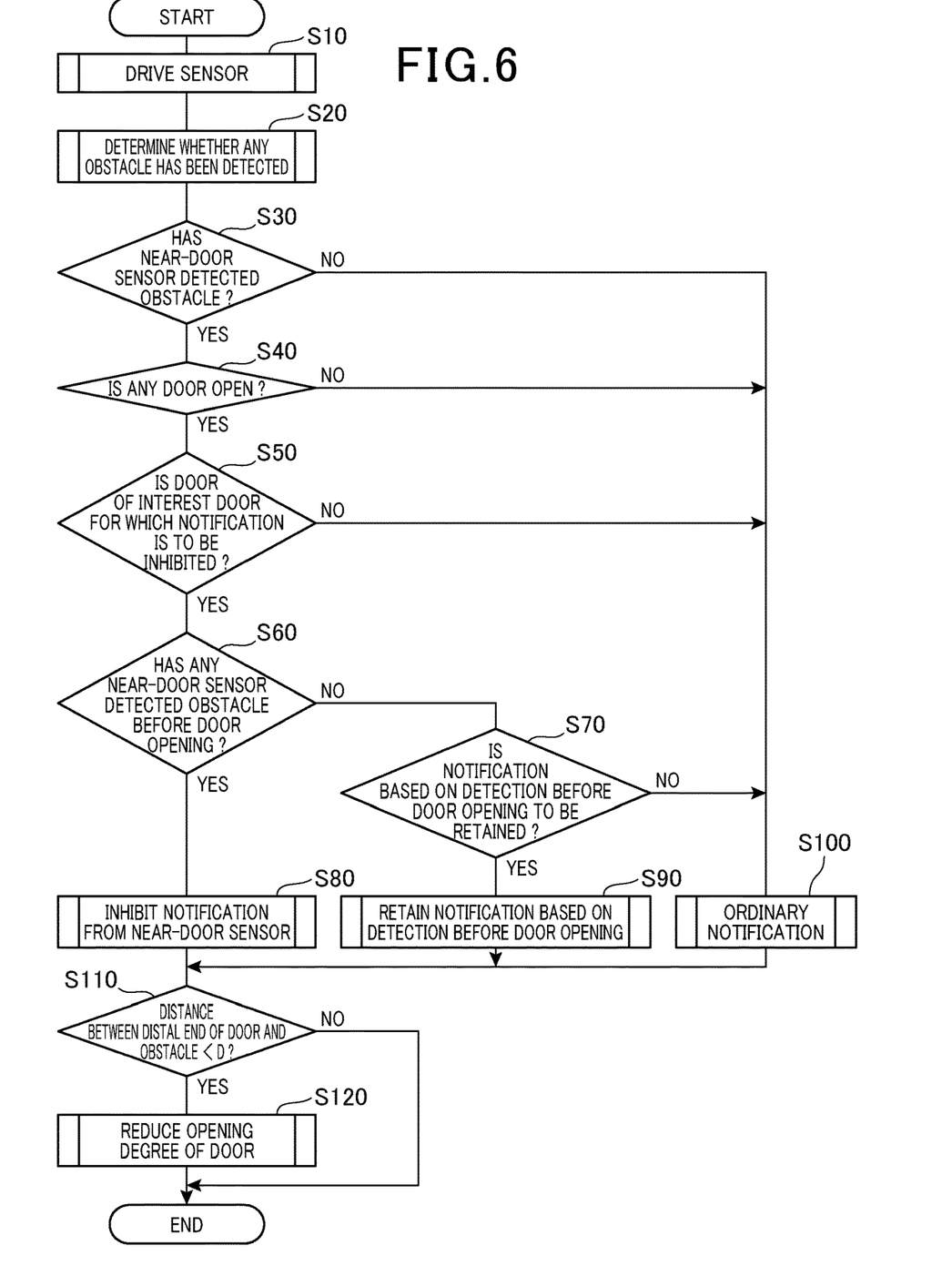
FIG. 6 is a flowchart illustrating control of the obstacle detecting device according to the third embodiment.

Control performed by the ECU 3 according to the third embodiment will be described with reference to a flowchart in FIG. 6.

A process in steps S10 to S100 is similar to the process described in the first embodiment and will thus not be described below.

In step S110 following step S80, S90, or S100, the ECU 3 determines whether a distance between a distal end of the door 4 and an obstacle such as a wall detected by the detection before door opening is smaller than a predetermined distance D. The position of the distal end of the door 4 can be calculated from the opening degree of the door 4 detected by the body imaging device 20 or the opening degree detecting sensor 21. The predetermined distance D has a value larger than 0 and can be optionally set.

In step S110, in a case where the distance between the distal end of the door 4 and the obstacle such as a wall detected by the detection before door opening is determined to be smaller than the predetermined distance D, the process proceeds to step S120. In step S120, the ECU 3 drives the door opening degree reducing device 22 to stop the opening of the door 4 at the predetermined angle. This prevents a collision between the distal end of the door 4 and the obstacle such as a wall detected by the detection before door opening.

On the other hand, in step S110, in a case where the distance between the distal end of the door 4 and the obstacle such as a wall detected by the detection before door opening is determined to be larger than the predetermined distance D, the process ends.

In the above-described third embodiment, the ECU 3 drives the door opening degree reducing device 22 to restrict an operating range of the door 4 when the distance between the distal end of the door 4 and the obstacle such as a wall detected by the detection before door opening is smaller than the predetermined distance D.

Thus, even in a case where the notifying operations of the notifying units 11, 14, and 15 resulting from the operation of the door 4 are inhibited, the door opening degree reducing device 22 restricts the opening of the door 4 to prevent a collision between the distal end of the door 4 and the obstacle. Accordingly, the obstacle detecting device 1 can improve convenience.

Fourth Embodiment

A fourth embodiment will be described. The fourth embodiment corresponds to the third embodiment with the driving condition for the door opening degree reducing device 22 changed, and is otherwise similar to the third embodiment. Thus, only differences from the third embodiment will be described.

Figure 7:
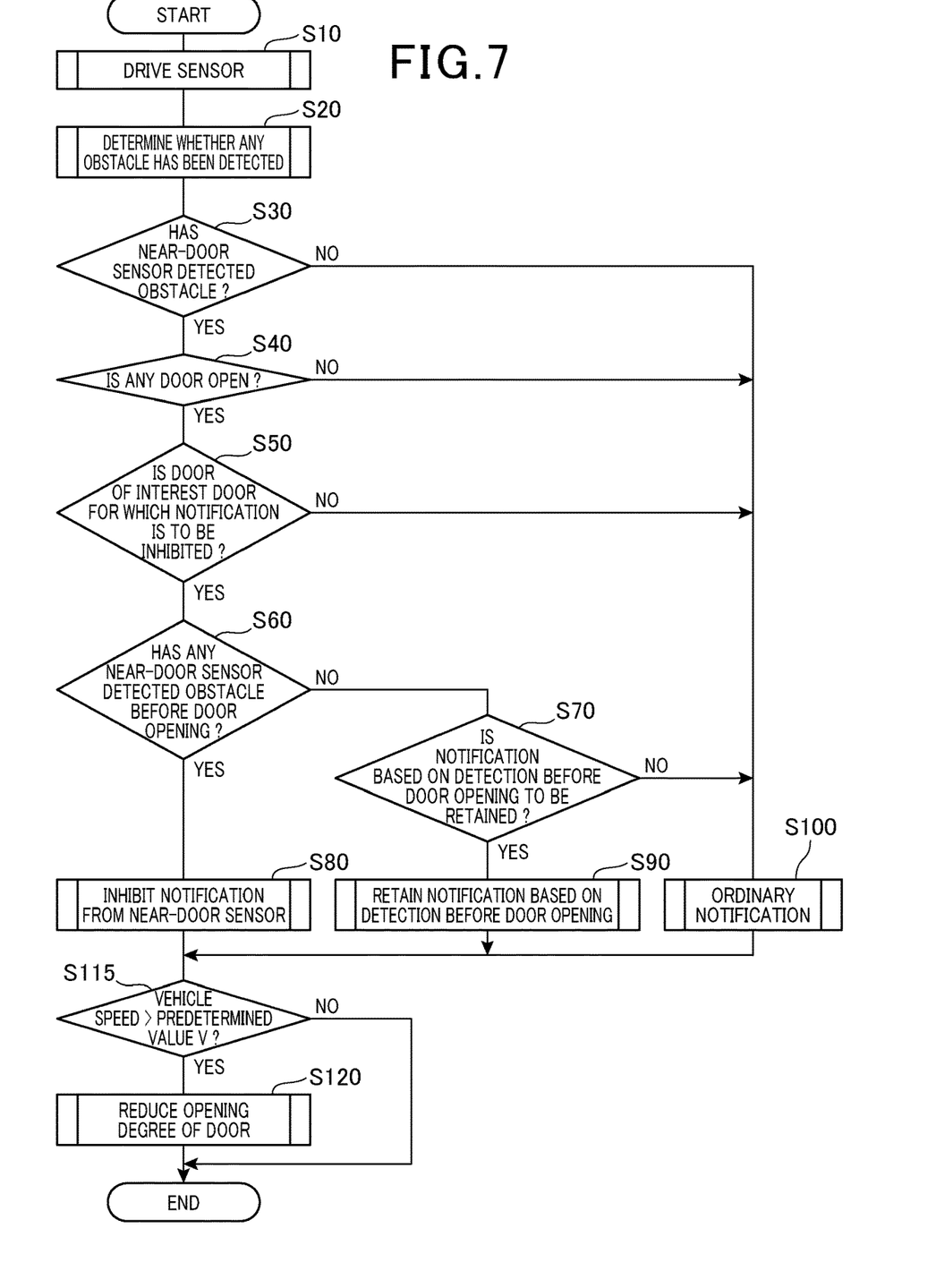
FIG. 7 is a flowchart illustrating control of an obstacle detecting device according to a fourth embodiment.

Control performed by the ECU 3 according to the fourth embodiment will be described with reference to a flowchart in FIG. 7.

A process in steps S10 to S100 is similar to the process described in the first embodiment and will thus not be described below.

In step S115 following step S80, S90, or S100, the ECU 3 detects whether the vehicle speed detected based on a signal output from the vehicle speed sensor 13 is higher than a predetermined value V. Here, the predetermined value V is set to a value above which the door 4 may be unexpectedly operated due to quick turning or acceleration of the vehicle. In step S115, in a case where the vehicle speed is higher than the predetermined value V, the process proceeds to step S120. In step S120, the ECU 3 drives the door opening degree reducing device 22 to stop the opening of the door 4 at a predetermined angle. This prevents the door 4 from being widely opened even in a case where the vehicle is quickly turned or accelerated.

On the other hand, in step S115, in a case where the vehicle speed is lower than the predetermined value V, the process ends.

In the above-described fourth embodiment, the ECU 3 drives the door opening degree reducing device 22 to restrict the operating range of the door 4.

Thus, even in a case where the notifying operations of the notifying units 11, 14, and 15 resulting from the operation of the door 4 are inhibited, the door opening degree reducing device 22 restricts the opening of the door 4 in a case where the vehicle speed is higher than the predetermined value. This prevents unexpected opening of the door 4. Accordingly, the obstacle detecting device 1 can improve convenience.

Fifth Embodiment

A fifth embodiment will be described. The fifth embodiment corresponds to the first and second embodiments with the control of the ECU 3 partially changed, and is otherwise similar to the first and second embodiments. Thus, only differences from the first and second embodiments will be described.

Figure 8:
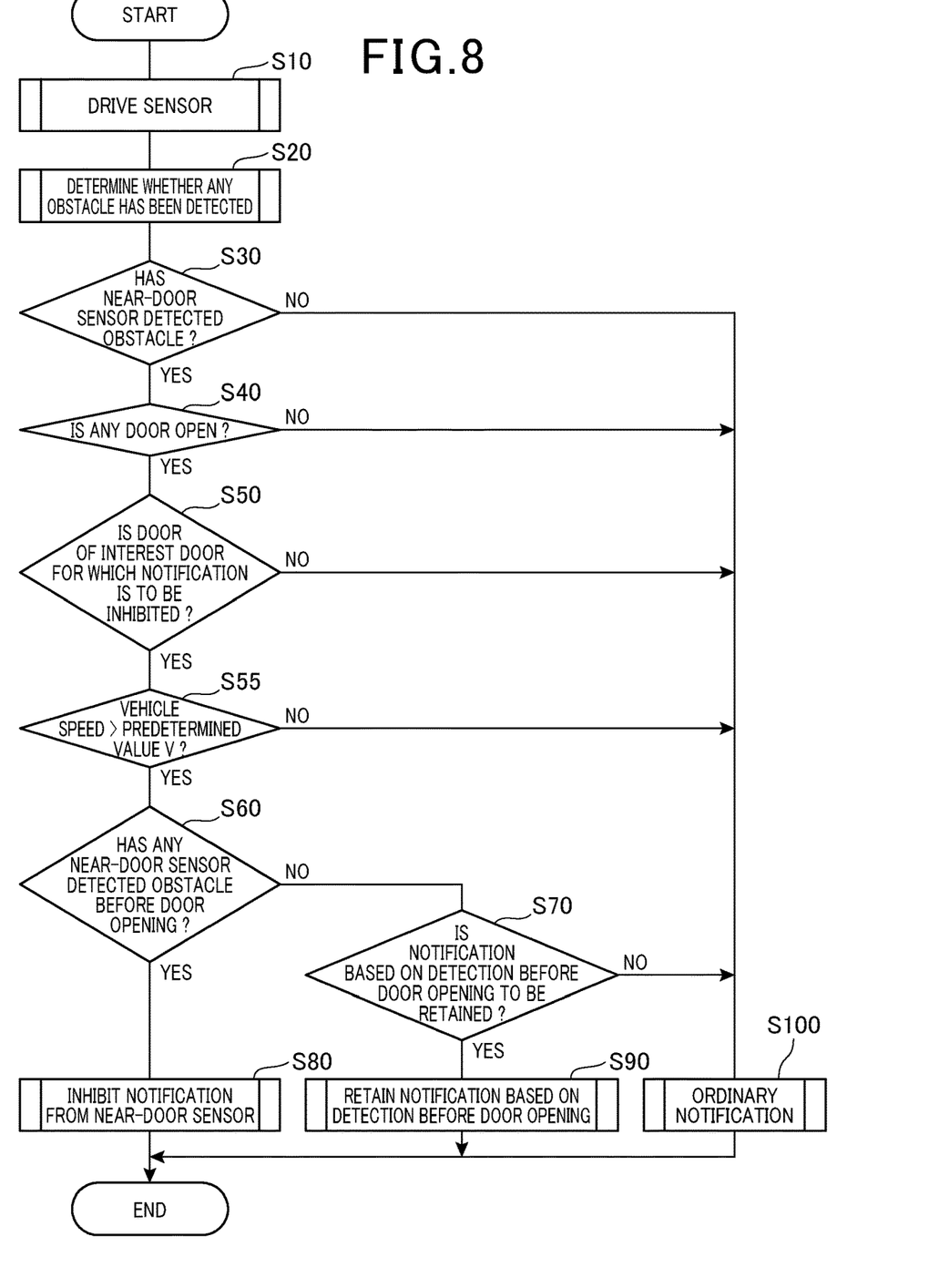
FIG. 8 is a flowchart illustrating control of an obstacle detecting device according to a fifth embodiment.

Control performed by the ECU 3 according to the fifth embodiment will be described with reference to a flowchart in FIG. 8.

A process in steps S10 to S50 is similar to the process described in the first embodiment and will thus not be described below.

In step S55 following step S50, the ECU 3 detects whether the vehicle speed detected based on the signal output from the vehicle speed sensor 13 is higher than the predetermined value V. Here, as is the case with the fourth embodiment, the predetermined value V is set to a value above which the door 4 may be unexpectedly operated due to quick turning or acceleration of the vehicle.

In step S55, in a case where the vehicle speed is higher than the predetermined value V, the process proceeds to step S100. In step S100, the ECU 3 performs the ordinary notification. Thus, the occupants are notified that the door 4 has been opened. Accordingly, the occupants can recognize that quick turning or acceleration of the vehicle may cause the door 4 to be widely opened.

On the other hand, in step S55, in a case where the vehicle speed is lower than the predetermined value V, the process proceeds to step S60. A process in step S60 and the subsequent steps is the same as the corresponding process described in the first embodiment, and will thus not be described below.

In the above-described fifth embodiment, the ECU 3 provides the ordinary notification when the vehicle speed is higher than the predetermined value V. Thus, the occupants can be informed that, when the vehicle speed is higher than the predetermined value V, quick turning or acceleration of the vehicle may cause the door 4 to be widely opened. This prevents the door 4 from being unexpectedly opened. Accordingly, the obstacle detecting device 1 can improve convenience.

Other Embodiments

The present disclosure is not limited to the above-described embodiments and can be appropriately changed. Furthermore, the above-described embodiments are not independent of one another but can be appropriately combined together unless the combination is clearly impossible. Additionally, in each of the above-described embodiments, elements constituting the embodiment are not necessarily essential, for example, unless the elements are specified as being essential or unless the elements are considered to be obviously essential. Furthermore, in each of the above-described embodiments, in a case where numerical values are referred to such as the numbers, numerical values, amounts, ranges, and the like of components of the embodiment, the embodiment is not limited to particular numbers, for example, unless the particular numbers are specified as being essential or unless the elements are in principle obviously limited to particular numbers. Additionally, in each of the above-described embodiments, when, for example, the shapes of components or the like or positional relations between components or the like are referred to, the embodiment is not limited to particular shapes, positional relations, or the like, for example, unless the particular shapes, positional relations, or the like are specified or unless the embodiment is in principle limited to the particular shapes, positional relations, or the like.

For example, in each of the above-described embodiments, the plurality of ECUs 3 and 6 to 9 provided in the vehicle have been described. In contrast, in other embodiments, the plurality of ECUs may be integrally configured or may include functions of other ECUs.

According to a first aspect illustrated by some or all of the above-described embodiments, the obstacle detecting device for detecting an obstacle around a vehicle includes a sensor, a notifying unit, an operation detecting unit, and a control unit. The sensor is installed at a fixed portion of the vehicle to detect an obstacle within a predetermined detection range with an origin corresponding to a position where the sensor is installed. The notifying unit provides a notification based on a signal output from the sensor. The operation detecting unit detects an operation of a movable portion of the vehicle moving within the detection range of the sensor. The control unit is enabled to inhibit a notifying operation of the notifying unit when the operation detecting unit detects an operation of the movable portion.

According to a second aspect, the control unit is capable of changing a setting of whether to inhibit the notifying operation of the notifying unit when the operation detecting unit detects the operation of the movable portion.

Thus, in a case where the occupants request to be notified of the operation of the movable portion, the control unit can retain the notifying operation of the notifying unit. On the other hand, in a case where the occupants do not request to be notified of the operation of the movable portion, the control unit can inhibit the notifying operation of the notifying unit. Accordingly, the obstacle detecting device can improve convenience according to the request or preference of the occupants or the like.

According to a third aspect, in a case where a plurality of sensors are installed on the vehicle, the control unit is enabled to inhibit the notifying operation of the notifying unit based on the signal output from a predetermined sensor of the sensors corresponding to the movable portion the operation of which has been detected by the operation detecting unit. On the other hand, the control unit retains the notifying operation of the notifying unit based on the signals output from the sensors other than the predetermined sensor.

Thus, even in a case where the notifying operation of the notifying unit is inhibited that is based on the signal output from the predetermined sensor having detected the operation of the movable portion, the notification is provided that is based on the signal output from another sensor having detected an obstacle. Accordingly, the obstacle detecting device reduces unnecessary notifications unintended by the occupants, while notifying the information about obstacles around the vehicle, thus allowing convenience to be improved.

According to a fourth aspect, the obstacle detecting device further includes a seating sensor outputting signals corresponding to sitting of occupants in respective seats in the vehicle. When the seating sensor detects that the occupant is sitting in a predetermined seat and the operation detecting unit detects an operation of the movable portion corresponding to the predetermined seat, the control unit is enabled to control the notifying operation of the notifying unit.

Thus, in a case where the movable portion is operated by an act of any of the occupants sitting in the predetermined seats, the control unit can inhibit the notifying operation of the notifying unit. On the other hand, in a case where the movable portion corresponding to the seat in which no occupant is sitting is operated from the outside, the notifying unit performs the notifying operation. Accordingly, the obstacle detecting device reduces unnecessary notifications unintended by the occupants, while notifying the other information, thus allowing convenience to be improved.

According to a fifth aspect, the obstacle detecting device further includes a seat belt wearing switch outputting signals corresponding to wearing of seat-belts of respective seats in the vehicle. When the seat belt wearing switch detects that any one of the seat-belt of the predetermined seat is worn and the operation detecting unit detects an operation of the movable portion corresponding to the predetermined seat, the control unit is enabled to control the notifying operation of the notifying unit.

Thus, in a case where the movable portion is operated by an act of any of the occupants sitting in the predetermined seats with the seat-belts worn, the control unit can inhibit the notifying operation of the notifying unit. On the other hand, in a case where the movable portion corresponding to the seat with the seat-belt not worn is operated, for example, from the outside, the notifying unit performs the notifying operation. Accordingly, the obstacle detecting device reduces unnecessary notifications unintended by the occupants, while notifying the other information, thus allowing convenience to be improved.

According to a sixth aspect, the obstacle detecting device further includes a shift position sensor outputting a signal corresponding to the shift position of the vehicle. When the shift position sensor detects that the shift position is set to parking and the operation detecting unit detects an operation of the movable portion, the control unit is enabled to control the notifying operation of the notifying unit.

In this case, the shift position being set to parking corresponds to the vehicle being parked or stopped. In general, while the vehicle is parked or stopped, the information about obstacles around the vehicle is unnecessary, and thus, the control unit can inhibit the notifying operation of the notifying unit. Accordingly, the obstacle detecting device can improve convenience.

According to a seventh aspect, the obstacle detecting device further includes a vehicle speed sensor outputting a signal corresponding to a vehicle speed of the vehicle. When the vehicle speed sensor detects that the vehicle speed is higher than a predetermined value and the operation detecting unit detects an operation of the movable portion, the control unit is enabled to retain the notifying operation of the notifying unit.

Consequently, when the predetermined value is several km/h, the vehicle speed being higher than the predetermined value corresponds to a state where the movable portion may be unexpectedly operated by quick turning of the vehicle or the like. Thus, in a case where the vehicle speed is higher than the predetermined value, the control unit can allow the notifying unit to perform the notifying operation as a result of an operation of the movable portion. Accordingly, the obstacle detecting device can improve convenience.

According to an eighth aspect, in a case where the operation detecting unit detects an operation of the movable portion after the sensor detects an obstacle, the control unit is enabled to retain the notifying operation of the notifying unit.

Consequently, when the notifying unit performs the notifying operation after the sensor detects an obstacle, the control unit can retain the notifying operation of the notifying unit in a case where the movable portion moving within the detection range of the sensor is operated. Thus, the notification of the information about the obstacle detected by the sensor is provided without being inhibited by an operation of the movable portion. Accordingly, the obstacle detecting device can prevent the occupants from being confused, improving convenience.

According to a ninth aspect, in a case where the operation detecting unit detects an operation of the movable portion after the sensor detects an obstacle, the control unit causes the notifying unit to perform a notifying operation based on a predetermined signal. The predetermined signal is one of a signal output from the sensor before the operation of the movable portion is detected or a signal output from the sensor after the operation of the movable portion is detected.

Thus, in a case where the notification is provided that is based on the signal output from the sensor before the operation of the movable portion is detected, the occupants can recognize, for example, the distance to the obstacle detected by the sensor. On the other hand, in a case where the notification is provided that is based on the signal output from the sensor after the operation of the movable portion is detected, the occupants can recognize the operation of the movable portion. The control unit can set which of the signals the notification is to be based on according to the occupants' request or preference.

According to a tenth aspect, the obstacle detecting device further includes a movement restricting unit capable of restricting the operation of the movable portion. The control unit drives the movement restricting unit to restrict the operation of the movable portion when a distance between the obstacle and the movable portion detected by the sensor is smaller than a predetermined distance.

Thus, even in a case where the notifying operation of the notifying unit is inhibited that is caused by an operation of the movable portion, the movement restricting unit restricts the operating range of the movable portion, preventing a collision between the movable portion and the obstacle. Accordingly, the obstacle detecting device can improve convenience.

According to an eleventh aspect, the fixed portion is a vehicle body or a portion located at a constant distance to the vehicle body. The movable portion is the vehicle body or at least one of side doors, a back door, and slide doors each located at a variable distance to the vehicle body. The operation detecting unit is at least one of courtesy switches detecting an operation of the movable portion, a body imaging device imaging the movable portion, or an opening degree detecting sensor detecting an opening degree of the movable portion.

Thus, the above-described various configurations can be adopted as the movable portion and the operation detecting unit.

What is claimed is:

1. An obstacle detecting device for detecting an obstacle around a vehicle, the obstacle detecting device comprising:
   a sensor installed at a fixed portion of the vehicle to detect an obstacle within a predetermined detection range with an origin corresponding to a position where the sensor is installed;
   a notifying unit providing a notification based on a signal output from the sensor;
   an operation detecting unit detecting an operation of a movable portion of the vehicle moving within the detection range of the sensor; and
   a control unit capable of inhibiting a notifying operation of the notifying unit regarding the operation of the movable portion when the operation detecting unit detects the operation of the movable portion.

2. The obstacle detecting device according to claim 1, wherein the control unit is capable of changing a setting of whether to inhibit the notifying operation of the notifying unit when the operation detecting unit detects the operation of the movable portion.

3. The obstacle detecting device according to claim 1, wherein in a case where a plurality of sensors is installed on the vehicle,
   the control unit is capable of inhibiting the notifying operation of the notifying unit based on the signal output from a predetermined sensor of the sensors corresponding to the movable portion the operation of which has been detected by the operation detecting unit, and
   the control unit retains the notifying operation of the notifying unit based on the signals output from the sensors other than the predetermined sensor.

4. The obstacle detecting device according to claim 1, further comprising a seating sensor outputting signals corresponding to sitting of occupants in respective seats in the vehicle, wherein
   when the seating sensor detects that an occupant is sitting in a predetermined seat and the operation detecting unit detects an operation of the movable portion corresponding to the predetermined seat, the control unit is enabled to control the notifying operation of the notifying unit.

5. The obstacle detecting device according to claim 1, further comprising a seat belt wearing switch outputting signals corresponding to wearing of seat-belts of respective seats in the vehicle, wherein
   when the seat belt wearing switch detects that any of the seat-belt of a predetermined seat is worn and the operation detecting unit detects an operation of the movable portion corresponding to the predetermined seat, the control unit is enabled to control the notifying operation of the notifying unit.

6. The obstacle detecting device according to claim 1, further comprising a shift position sensor outputting a signal corresponding to a shift position of the vehicle, wherein
   when the shift position sensor detects that the shift position is set to parking and the operation detecting unit detects an operation of the movable portion, the control unit is enabled to control the notifying operation of the notifying unit.

7. The obstacle detecting device according to claim 1, further comprising a vehicle speed sensor outputting a signal corresponding to a vehicle speed of the vehicle, wherein
   when the vehicle speed sensor detects that the vehicle speed is higher than a predetermined value and the operation detecting unit detects an operation of the movable portion, the control unit is enabled to retain the notifying operation of the notifying unit.

8. The obstacle detecting device according to claim 1, wherein in a case where the operation detecting unit detects an operation of the movable portion after the sensor detects an obstacle, the control unit can retain the notifying operation of the notifying unit.

9. The obstacle detecting device according to claim 1, wherein in a case where the operation detecting unit detects an operation of the movable portion after the sensor detects an obstacle, the control unit causes the notifying unit to perform a notifying operation based on one of a signal output from the sensor before the operation of the movable portion was detected or a signal output from the sensor after the operation of the movable portion is detected.

10. The obstacle detecting device according to claim 1, further comprising a movement restricting unit capable of restricting the operation of the movable portion, wherein
    the control unit drives the movement restricting unit to restrict the operation of the movable portion when a distance between the obstacle and the movable portion detected by the sensor is shorter than a predetermined distance.

11. The obstacle detecting device according to claim 1, wherein the fixed portion is a vehicle body or a portion located at a constant distance to the vehicle body,
    the movable portion is the vehicle body or at least one of side doors, a back door, and slide doors each located at a variable distance to the vehicle body, and
    the operation detecting unit is at least one of a courtesy switch detecting an operation of the movable portion, a body imaging device imaging the movable portion, or an opening degree detecting sensor detecting an opening degree of the movable portion.

* * * * *